United States Patent
Chen et al.

(10) Patent No.: US 10,598,730 B1
(45) Date of Patent: Mar. 24, 2020

(54) TESTING METHOD AND TESTING SYSTEM

(71) Applicant: Realtek Semiconductor Corporation, Hsinchu (TW)

(72) Inventors: Chihtung Chen, San Diego, CA (US); Yi-Te Yeh, Hsinchu County (TW); Chia-Hsien Cheng, Hsinchu (TW); I-Chang Wu, Kaohsiung (TW); Huai-Yu Yen, Taichung (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 16/188,699

(22) Filed: Nov. 13, 2018

(51) Int. Cl.
 - G01R 31/3185 (2006.01)
 - G06F 11/26 (2006.01)
 - G06F 17/50 (2006.01)
 - G01R 31/3181 (2006.01)

(52) U.S. Cl.
CPC ........ G01R 31/318547 (2013.01); G01R 31/31813 (2013.01); G06F 11/261 (2013.01); G06F 17/5022 (2013.01)

(58) Field of Classification Search
None
See application file for complete search history.

(56) References Cited

U.S. PATENT DOCUMENTS

| | | | | |
|---|---|---|---|---|
| 5,105,374 | A * | 4/1992 | Yoshida | G06F 11/24 703/13 |
| 5,604,895 | A * | 2/1997 | Raimi | G01R 31/31835 703/13 |
| 5,724,504 | A * | 3/1998 | Aharon | G06F 17/5022 714/33 |
| 6,631,344 | B1 * | 10/2003 | Kapur | G06F 11/263 702/117 |
| 7,373,621 | B1 * | 5/2008 | Dastidar | G01R 31/3183 714/726 |
| 7,539,957 | B1 * | 5/2009 | Nagarandal | G01R 31/31813 714/726 |
| 7,562,274 | B2 * | 7/2009 | Chorn | G01R 31/318583 714/31 |
| 9,529,697 | B1 * | 12/2016 | Aldrich | G06F 8/10 |
| 2018/0300434 | A1 * | 10/2018 | Hu | G06F 17/504 |

* cited by examiner

*Primary Examiner* — Phung M Chung
(74) *Attorney, Agent, or Firm* — Locke Lord LLP; Tim Tingkang Xia, Esq.

(57) ABSTRACT

A testing method is performed by at least one processor and includes following operations: converting first data associated with a scan test into a program, in which the program is configured to observe an untested part of a circuitry that is unable to be tested in the scan test; performing circuit simulations with the program according to a netlist file indicating the circuitry and testing patterns, in order to rank the testing patterns to generate second data; selecting at least one candidate testing pattern from the testing patterns according to the second data; and performing at least one fault simulation on the circuitry according to the netlist file and the at least one candidate testing pattern, in order to test the circuitry.

16 Claims, 4 Drawing Sheets

TESTING METHOD AND TESTING SYSTEM

BACKGROUND

Technical Field

The present disclosure relates to a testing method and a testing system. More particularly, the present disclosure relates to a testing method and a testing system for integrated circuits.

Description of Related Art

Various methods for testing integrated circuits of a chip have been developed. However, in current methods, the testing procedure requires a long time (e.g., weeks, and sometimes months) to evaluate a sufficient number of defect devices in the chip, in order to obtain a persuasive diagnosed result. As a result, the efficiency of testing and manufacturing the chip is thus reduced.

SUMMARY

Some aspects of the present disclosure are to a testing method that is performed by at least one processor and includes following operations: converting first data associated with a scan test into a program, in which the program is configured to observe an untested part of a circuitry that is unable to be tested in the scan test; performing circuit simulations with the program according to a netlist file indicating the circuitry and testing patterns, in order to rank the testing patterns to generate second data; selecting at least one candidate testing pattern from the testing patterns according to the second data; and performing at least one fault simulation on the circuitry according to the netlist file and the at least one candidate testing pattern, in order to test the circuitry.

Some aspects of the present disclosure are to provide a testing system that includes a memory and a processor. The memory is configured to store a computer program code. The processor is configured to execute the computer program code to: convert first data associated with a scan test into a program, in which the program is configured to observe an untested part of a circuitry that is unable to be tested in the scan test; perform of circuit simulations with the program according to a netlist file indicating the circuitry and testing patterns, in order to rank the testing patterns to generate second data; select at least one candidate testing pattern from the testing patterns according to the second data; and perform at least one fault simulation on the circuitry according to the netlist file and the at least one candidate testing pattern, in order to test the circuitry.

As described above, the testing system and method provided herein are able to improve the efficiency of testing integrated circuits and increase the coverage of the testing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals.

Figure 1:
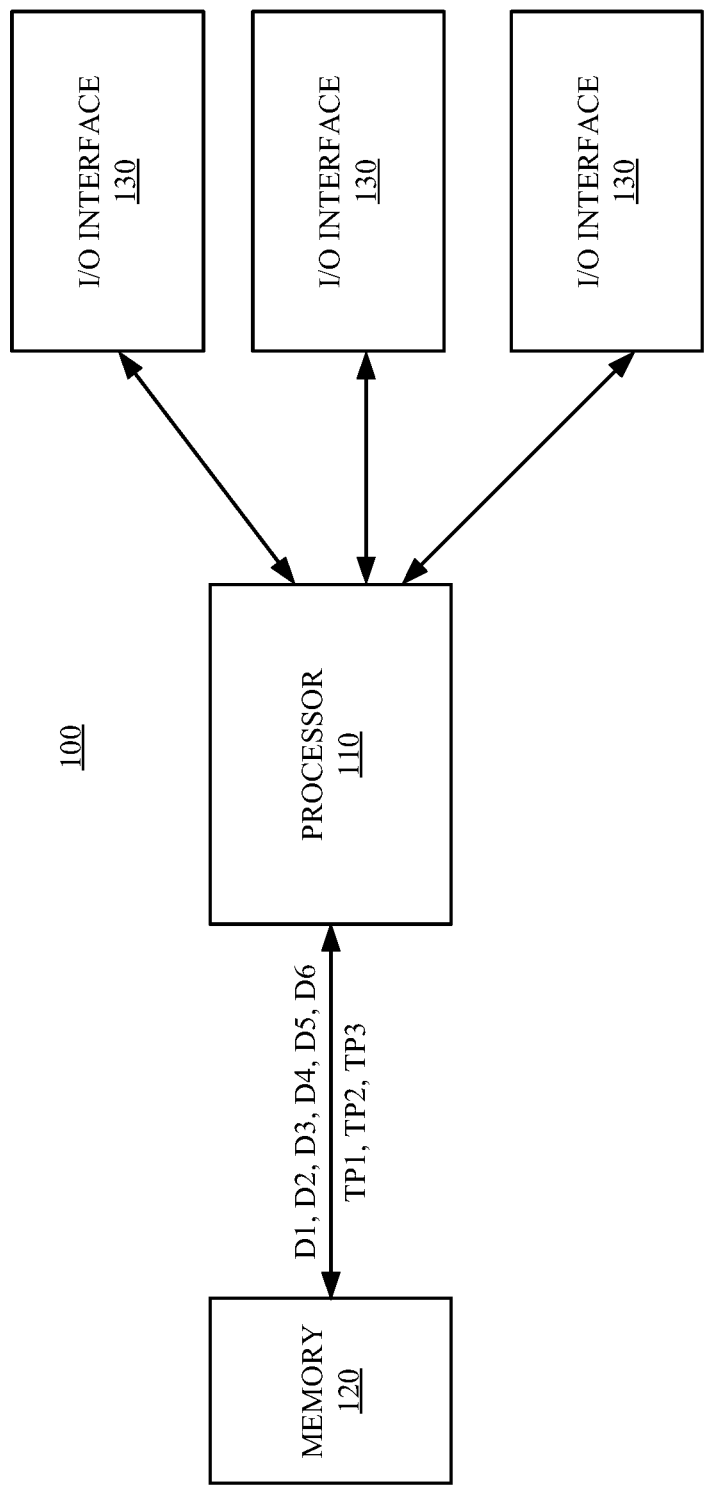
FIG. 1 is a schematic diagram of a testing system, according to some embodiments of the present disclosure.

Reference is made to FIG. 1. FIG. 1 is a schematic diagram of a testing system 100 according to some embodiments of the present disclosure.

As shown in FIG. 1, the testing system 100 includes a processor 110, a memory 120, and input/output (I/O) interfaces 130. The processor 110 is coupled to the memory 120 and the I/O interfaces 130. In various embodiments, the processor 110 may be implemented with at least one processor circuit, a central processing unit (CPU), an application specific integrated circuit (ASIC), a multi-processor, a distributed processing system, or a suitable processing circuitry. Various circuits or units to implement the processor 110 are within the contemplated scope of the present disclosure.

The memory 120 stores at least one program code for testing integrated circuits. For illustration, the memory 120 stores at least one program code encoded with a set of instructions for testing or verifying functionality of integrated circuits. The processor 110 may execute the at least one program code stored in the memory 120, and the operations of testing or verifying functionality of the integrated circuits are able to be automatically performed.

In some embodiments, the memory 120 is a non-transitory computer readable storage medium encoded with, i.e., storing, a set of executable instructions for testing integrated circuits. For illustration, the memory 120 stores executable instructions for performing operations including, for example, operations illustrated in FIG. 3. In some embodiments, the computer readable storage medium is an electronic, magnetic, optical, electromagnetic, infrared, and/or a semiconductor system (or apparatus or device). For example, the computer readable storage medium includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium includes a compact disk-read only memory (CD-ROM), a compact disk-read/write (CD-R/W), and/or a digital video disc (DVD).

The I/O interfaces 130 receive inputs or commands (not shown) from various control devices, which, for example, are operated by a circuit designer or a testing engineer. Accordingly, the testing system 100 may be manipulated with the inputs or commands received by the I/O interfaces 130. In some embodiments, the I/O interfaces 130 include a display configured to display the status of executing the program code. In various embodiments, the I/O interfaces 130 include a graphical user interface (GUI), a keyboard, keypad, mouse, trackball, track-pad, touch screen, cursor direction keys, or the combination thereof, for communicating information and commands to the processor 110.

Figure 2:
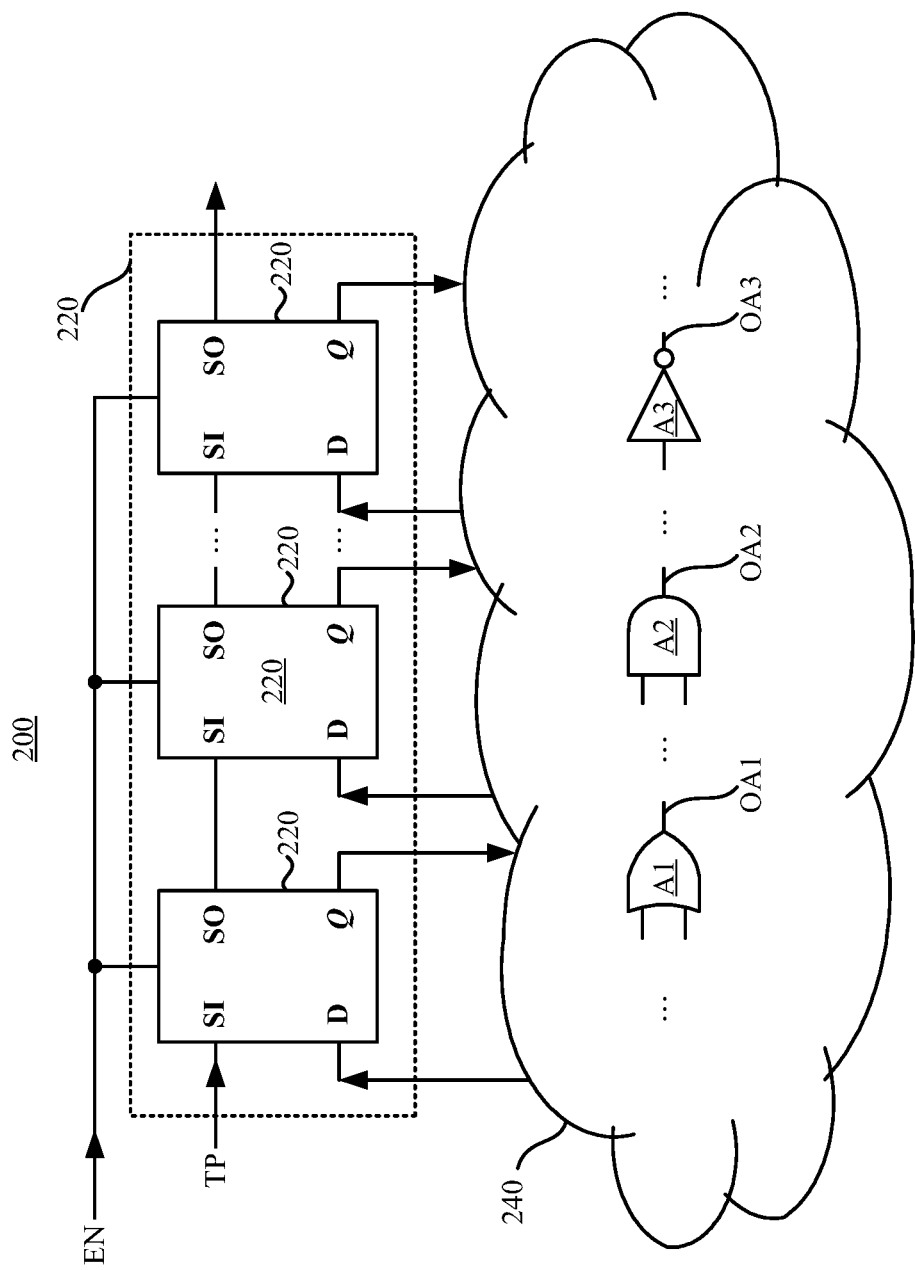
FIG. 2 is a schematic diagram of a circuitry according to some embodiments of the present disclosure.

Reference is made to FIG. 2. FIG. 2 is a schematic diagram of a circuitry 200 according to some embodiments of the present disclosure. In order to facilitate the illustration of a testing method 300 of FIG. 3, various related terms or components are introduced with reference to FIG. 2.

The circuitry 200 includes a scan chain circuit 220 and a logic circuit 240. The scan chain circuit 220 includes flip-flops that are coupled in series via scan-input terminals SI and scan-output terminals SO thereof. The scan chain circuit 220 is coupled to the logic circuit 240 via input terminals D and output terminals Q thereof. In some embodiments, the scan chain circuit 220 operates in a scan mode in response to a scan enable signal EN and various testing patterns TP, in order to perform a scan test on the logic circuit 240. In some embodiments, the logic circuit 240 may include various digital circuit, combinational logic circuit, etc. As an example, the logic circuit 240 at least includes logic gates A1-A3 having output terminals OA1-OA3 respectively.

In some embodiments, a circuit designer is able to design the circuitry 200 by describing the circuitry 200 through a netlist file D1. In some embodiments, contents of the netlist file are in compliance with a predetermined type of syntax, which may record and/or design a circuit in a descriptive format recognizable by the testing system 100. In some embodiments, the predetermined type of syntax is BERKELEY SPICE syntax. In some other embodiments, the predetermined type of syntax is HSPICE syntax. The types of the netlist file D1 are given for illustrative purposes. Various types of the netlist file are within the contemplated scope of the present disclosure.

In some embodiments, the I/O interfaces 130 may receive the netlist file D1 indicating the circuitry 200. In some embodiments, the memory 120 stores one or more program codes (which may indicate a test tool) that are executed to perform tests and analysis according to the netlist file D1. In some embodiments, for running the scan test, the processor 110 may execute the testing tool according to the netlist file D1, in order to generate the scan enable signal EN and the testing patterns TP in FIG. 2. In some embodiments, the netlist file D1 is a gate-level netlist file.

Figure 3:
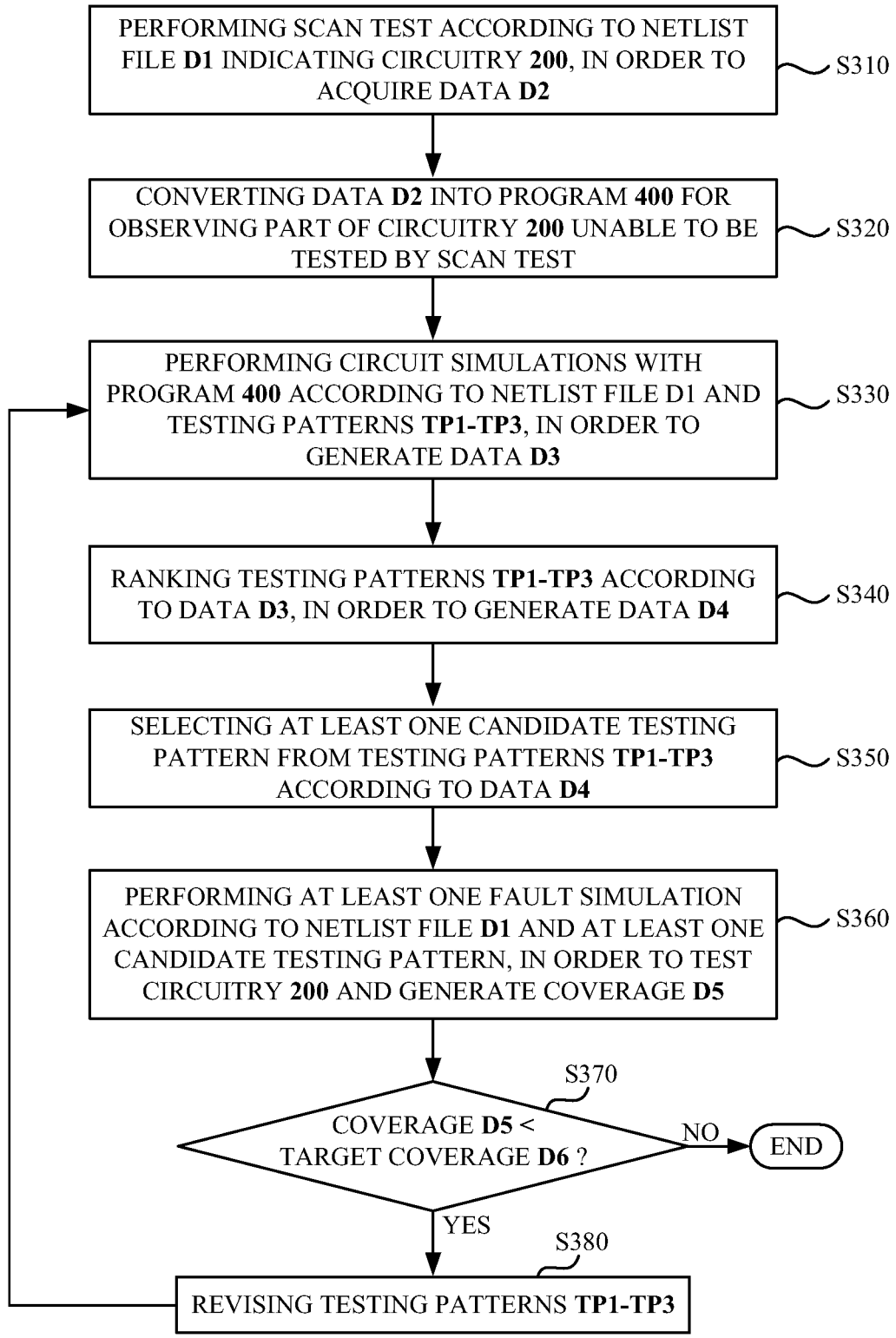
FIG. 3 is a flow chart of a testing method in FIG. 1, according to some embodiments of the present disclosure.

Reference is made to FIG. 3. FIG. 3 is a flow chart of a testing method 300, according to some embodiments of the present disclosure. For ease of understanding, the testing method 300 is described below with reference to FIGS. 1-2.

In operation S310, a scan test is performed according to the netlist file D1 indicating the circuitry 200 to acquire data D2.

For example, in response to a command (not shown) and the netlist file D1 transmitted from the I/O interfaces 130, the processor 110 executes the testing tool to perform the scan test on the circuitry 200. After the scan test is performed, the processor 110 may output a summary report of the scan test as the data D2, and may store the same into the memory 120. In some embodiments, the data D2 includes information about which part of the circuitry 200 is unable to be tested by the scan test (hereinafter referred to as "untested part of the circuitry 200"). As an example, the logic gates A1-A3 are not able to be covered by the scan test, and thus the information in the data D2 specify that three logic gates A1-A3 in the circuitry 200 are not tested. In this example, the untested part of the circuitry 200 includes these logic gates A1-A3.

In operation S320, the data D2 is converted into a program 400 for observing the part of the circuitry 200 unable to be tested by the scan test.

Figure 4:
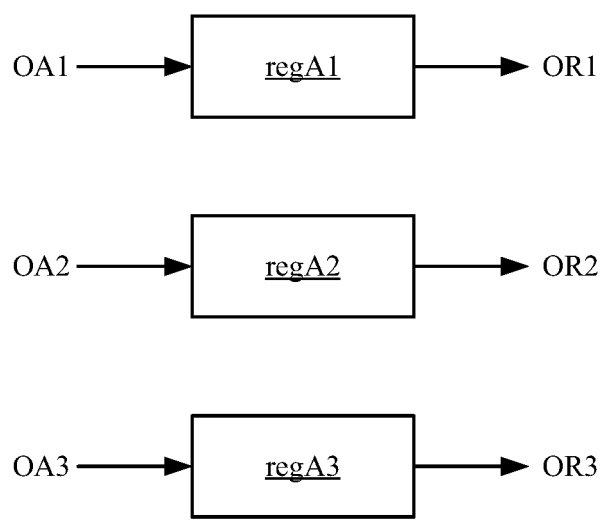
FIG. 4 is a schematic diagram illustrating a conceptual behavior of the program, according to some embodiments of the present disclosure.

To illustrate operation S320, reference is also made to FIG. 4, and FIG. 4 is a schematic diagram illustrating a conceptual behavior of the program 400, according to some embodiments of the present disclosure. In some embodiments, the processor 110 generates the program 400 in response to the data D2. For example, as mentioned above, the logic gates A1-A3 are unable to be by tested by the scan test. Under this condition, the processor 110 may generate the program 400 in FIG. 4 based on the data D2, in order to observe the logic gates A1-A3 in subsequent tests.

As shown in FIG. 4, in the program 400, virtual registers regA1, regA2, and regA3 may be set by various instructions or programming languages. The virtual registers regA1, regA2, and regA3 are configured to perform a counting operation in response to changes in the output terminals OA1, OA2, OA3, respectively, in order to generate signal values OR1-OR3. For example, whenever a signal value outputted from the output terminal OA1 is changed in subsequent tests, the signal value OR1 is increased by 1. With this analogy, the signal values OR1-OR3 (i.e., an output result of the program 400) can be used to monitor a number of times that the logic gates A1-A3 are triggered in subsequent tests.

The number of the virtual registers in FIG. 4 is given for illustrative purposes. In some embodiments, the number of the virtual registers is determined according to a number of circuits in the untested part of the circuitry 200. In some embodiments, the behavior or function of the program 400 can be encoded with various programming languages, and can be stored in the memory 120. In some embodiments, the program 400 may be integrated with the testing tool, such that the processor 110 may execute the testing tool to execute and/or generate the program 400.

With continued reference to FIG. 3, in operation S330, circuit simulations are performed with the program 400 according to the netlist file D1 and testing patterns TP1-TP3, in order to generate data D3.

In some embodiments, the testing patterns TP1-TP3 are predetermined and stored in the memory 120. The testing patterns TP1-TP3 indicate different input vectors (or signals) for the circuitry 200. In some embodiments, the processor 110 may execute the testing tool and/or a simulation tool (e.g., HSPICE, static timing analyzer tool, and function verification tool) in the memory 120 with the program 400 according to the netlist file D1 and the testing patterns TP1-TP3, in order to run circuit simulations on the circuitry 200.

For example, a first circuit simulation, a second circuit simulation, and a third circuit simulation are performed with the program 400 based on the testing patterns TP1, TP2, and TP3, respectively. During each circuit simulation, the values of the registers regA1-regA3 in the program 400 will be updated if a corresponding circuit (or gate) in the untested part of the circuitry 200 is triggered by the testing patterns TP1-TP3. For example, during the first circuit simulation, if the logic gate A1 is triggered in response to the testing pattern TP1, the signal value outputted from the output terminal OA1 is changed, and the value OR1 is increased correspondingly.

After all circuit simulations are performed, the processor 110 outputs a summary report of the circuit simulations as the data D3 based on the values OR1-OR3 of the registers regA1-regA3 in the program 400, and stores the same into the memory 120. In some embodiments, the data D3 includes information about a number of circuits (or gates), which are triggered in response to each of testing patterns TP1-TP3, in the untested part of the circuitry 200.

In operation S340, the testing patterns TP1-TP3 are ranked according to the data D3, in order to generate data D4.

To illustrate operation S340, reference is also made to Table 1. Table 1 show contents in the data D4 according to some embodiments of the present disclosure. In some embodiments, the processor 110 executes the testing tool to rank the testing patterns TP1-TP3 according to the data D3, in order to a summary report (i.e., Table 1) as the data D4.

TABLE 1

| Number of circuits in untested part of circuitry 200: 4288 | | | |
|---|---|---|---|
| Testing Pattern | Ranking Number | Triggered Ratio | Number of triggered circuits |
| TP1 | 3 | 0% | 0 |
| TP2 | 2 | 59.47% | 2550 |
| TP3 | 1 | 75.79% | 3250 |

In some embodiments, the processor 110 may execute the testing tool to analyze the data D3, in order to determine triggered ratios corresponding to the testing patterns TP1-TP3, respectively. For example, according to the data D3, the processor 110 acquires that a number of circuits (or gates), which are triggered in response to the testing pattern TP1, in the untested part of the circuitry 200 (hereinafter to referred as "first number") is zero, and that a number of all circuits (or gates) in the untested part of the circuitry 200 (hereinafter referred to as "second number") is 4288. Accordingly, the processor 110 divides the second number by the first number to determine that the triggered ratio corresponding to the testing pattern TP1 is 0%. With the same analogy, if the first numbers corresponding to the testing patterns TP2-TP3 are 2550 and 3250 respectively, the triggered ratios corresponding to the testing patterns TP2-TP3 are determined as 59.47% and 75.79% respectively.

In some embodiments, the processor 110 ranks the testing patterns TP1-TP3 based on the triggered ratios. In some embodiments, the testing pattern that corresponds to a higher triggered ratio is assigned with a higher rank. In the example of table 1, the triggered ratio of 75.79% is the highest ratio, and thus the corresponding testing pattern TP3 is assigned with ranking number 1 (e.g., the highest rank). With this analogy, the testing pattern TP2 is assigned with ranking number 2, and the testing pattern TP3 is assigned with ranking number 3 (e.g., a lowest rank).

Reference is made to table 2. The table 2 shows contents in the data D4, according to some other embodiments of the present disclosure.

TABLE 2

| Number of circuits in untested part of circuitry 200: 4288 | | | | |
|---|---|---|---|---|
| Testing Pattern | Ranking Number | Triggered Ratio | Number of triggered circuits | Triggered Circuits |
| TP1 | 2 | 49.38% | 2117 | A1 |
| TP2 | 3 | 59.47% | 2550 | A2, A3 |
| TP3 | 1 | 75.79% | 3250 | A2, A3 |

Compared with the table 1, in some further embodiments, the processor 110 ranks the testing patterns TP1-TP3 based on the triggered ratios and coverages for the untested part of the circuitry 200. In the example of the table 2, the triggered ratios corresponding to the testing patterns TP1-TP3 are determined as 49.38%, 59.47%, and 75.79% respectively. Furthermore, according to the data D3, the processor 110 acquires that the logic gates A1 is triggered in response to the testing pattern TP1, and the logic gates A2-A3 are triggered in response to the testing patterns TP2-TP3. In other words, the logic gates A2-A3 are both covered by simulations performed with the testing patterns TP2-TP3. Under this condition, considering the coverage and the diversity of the testing patterns, the processor 110 assigns a ranking number 1 to the testing pattern TP3, assigns a ranking number 2 to the testing pattern TP1, and assigns a ranking number 3 to the testing pattern TP1.

In other words, as both of the logic gates A2-A3 are covered by the testing patterns TP2-TP3 and the testing pattern TP3 gets higher triggered ratio, the testing pattern TP3 is assigned with ranking number 1. As the logic gate A1 is only covered by testing pattern TP1, the testing pattern TP1 is then assigned with a higher rank than the testing pattern TP2 is due to its uniqueness.

With continued reference to FIG. 3, in operation S350, at least one candidate testing pattern is selected from the testing patterns TP1-TP3 according to the data D4.

For example, in the example of the table 1, based on the ranking, the processor 110 may select the testing patterns TP2-TP3 as the candidate testing patterns. Alternatively, in the example of the table 2, based on the ranking, the processor 110 may select the testing patterns TP1 and TP3 as the candidate testing patterns, in order to increase the overall coverage of the subsequent tests.

In operation S360, at least one fault simulation is performed according to the netlist file D1 and the at least one candidate testing pattern, in order to test the circuitry 200 and generate a coverage D5.

For example, in response to the netlist file D1, the candidate testing patterns, and a command (not shown) received by the I/O interfaces 130, the processor 110 executes the testing tool and/or a fault simulation tool to perform the fault simulations on the circuitry 200. Each fault simulation is performed with one testing pattern of the at least one candidate testing pattern. After the fault simulations are performed, the processor 110 is able to locate the defects in the circuitry 200.

In some related approaches, fault simulations are required to be performed with all testing patterns, in order to increase the coverage of the fault simulations. In these approaches, the coverage of the testing patterns is required to be manually checked by a circuit designer or a testing engineer after one fault simulation is performed. Moreover, as the all testing patterns are employed to run the fault simulation, the total time for running the fault simulations is significantly increased. Compared with these approaches, with the arrangements of the program 400, the testing system 100 is able to select candidate testing patterns from the all testing patterns by considering the coverage and the diversity (e.g., the triggered ratio), in order to run the fault simulations based on the candidate testing patterns. As a result, the convenience and the efficiency of running the fault simulation are improved, and the coverage D5 of the fault simulation is increased by candidate testing patterns.

In operation S370, whether the coverage D5 of the fault simulations performed in operation S360 is lower than a target coverage D6 is determined. If the coverage D5 is lower than the target coverage D6, operation S380 is performed. In operation S380, the testing patterns TP1-TP3 are revised. After operation S380 is performed, operations S330, S340, S350, S360, and S370 are performed again.

The above description of the testing method 300 includes exemplary operations, but the operations of the testing method 300 are not necessarily performed in the order described above. The order of the operations of the testing method 300 can be changed, or the operations can be executed simultaneously or partially simultaneously as appropriate, in accordance with the spirit and scope of various embodiments of the present disclosure.

In some embodiments, the testing method 300 is implemented as a testing tool carried on a non-transitory computer-readable medium. In other words, the testing method 300 may be implemented in hardware (e.g., the testing system 100), software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized. Various arrangements to implement the testing method 300 are within the contemplated scope of the present disclosure.

As described above, the testing system and method provided herein are able to improve the efficiency of testing integrated circuits and increase the coverage of the testing.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A testing method, performed by at least one processor, the testing method comprising:
   converting first data associated with a scan test into a program, wherein the program is configured to observe an untested part of a circuitry that is unable to be tested in the scan test;
   performing a plurality of circuit simulations with the program according to a netlist file indicating the circuitry and a plurality of testing patterns, in order to rank the plurality of testing patterns to generate second data;
   selecting at least one candidate testing pattern from the plurality of testing patterns according to the second data; and
   performing at least one fault simulation on the circuitry according to the netlist file and the at least one candidate testing pattern, in order to test the circuitry.

2. The testing method of claim 1, wherein performing the plurality of circuit simulations comprises:
   performing the plurality of circuit simulations with the program according to the netlist file and the plurality of testing patterns, in order to generate third data based on an output result of the program,
   wherein the output result of the program indicates a first number of a plurality of circuits, which are triggered in response to each of the plurality of testing patterns, in the untested part of the circuitry; and
   ranking the plurality of testing patterns according to the third data, in order to generate the second data.

3. The testing method of claim 2, wherein ranking the plurality of testing patterns comprises:
   determining a plurality of triggered ratios corresponding to the plurality of testing patterns respectively according to the third data; and
   ranking the plurality of testing patterns according to the plurality of triggered ratios.

4. The testing method of claim 3, wherein if a first triggered ratio of the plurality of triggered ratios is higher, a first testing pattern of the plurality of testing patterns is assigned with a higher ranking number, and the first testing pattern corresponds to the first triggered ratio.

5. The testing method of claim 3, wherein determining the plurality of triggered ratios comprises:
   dividing a second number of all circuits in the untested part of a circuitry by the first number, in order to determine a first triggered ratio of the plurality of triggered ratios.

6. The testing method of claim 1, wherein converting the first data associated with the scan test into the program comprises:
   setting a plurality of virtual registers in the program based on information about a plurality of terminals associated with the untested part of the circuitry.

7. The testing method of claim 6, wherein the plurality of virtual registers are configured to be updated if the untested part of the circuitry are triggered in response to the plurality of testing patterns during the plurality of circuit simulations.

8. The testing method of claim 6, further comprising:
   performing a scan test according to the netlist file, in order to acquire the information about the plurality of terminals.

9. A testing system comprising:
a memory configured to store a computer program code; and
a processor configured to execute the computer program code to:
convert first data associated with a scan test into a program, wherein the program is configured to observe an untested part of a circuitry that is unable to be tested in the scan test;
perform a plurality of circuit simulations with the program according to a netlist file indicating the circuitry and a plurality of testing patterns, in order to rank the plurality of testing patterns to generate second data;
select at least one candidate testing pattern from the plurality of testing patterns according to the second data; and
perform at least one fault simulation on the circuitry according to the netlist file and the at least one candidate testing pattern, in order to test the circuitry.

10. The testing system of claim 9, wherein the processor is configured to perform the plurality of circuit simulations with the program according to the netlist file and the plurality of testing patterns, in order to generate third data based on an output result of the program,
wherein the output result of the program indicates a first number of a plurality of circuits, which are triggered in response to each of the plurality of testing patterns, in the untested part of the circuitry, and the processor is further configured to rank the plurality of testing patterns according to the third data, in order to generate the second data.

11. The testing system of claim 10, wherein the processor is configured to determine a plurality of triggered ratios corresponding to the plurality of testing patterns respectively according to the third data, and to rank the plurality of testing patterns according to the plurality of triggered ratios.

12. The testing system of claim 11, wherein if a first triggered ratio of the plurality of triggered ratios is higher, a first testing pattern of the plurality of testing patterns is assigned with a higher ranking number, and the first testing pattern corresponds to the first triggered ratio.

13. The testing system of claim 11, wherein the processor is configured to divide a second number of all circuits in the untested part of a circuitry by the first number, in order to determine a first triggered ratio of the plurality of triggered ratios.

14. The testing system of claim 9, wherein the processor is configured to set a plurality of virtual registers in the program based on information about a plurality of terminals associated with the untested part of the circuitry.

15. The testing system of claim 14, wherein the plurality of virtual registers are configured to be updated if the untested part of the circuitry are triggered in response to the plurality of testing patterns during the plurality of circuit simulations.

16. The testing system of claim 14, wherein the processor is further configured to perform a scan test according to the netlist file, in order to acquire the information about the plurality of terminals.

* * * * *